United States Patent [19]
Nakagawa et al.

[11] 3,980,747
[45] Sept. 14, 1976

[54] PRODUCTION OF SYNTHETIC RESIN SPINNERETTE

[75] Inventors: Kazumi Nakagawa; Keitaro Shimoda; Nobuhiro Tsutsui; Keiichi Zoda, all of Okayama, Japan

[73] Assignee: Japan Exlan Company Limited, Osaka, Japan

[22] Filed: Oct. 14, 1972

[21] Appl. No.: 189,402

Related U.S. Application Data

[63] Continuation of Ser. No. 822,393, May 7, 1969, abandoned.

[30] Foreign Application Priority Data

May 30, 1968 Japan.............................. 43-37292

[52] U.S. Cl.............................. 264/221; 264/220; 264/225; 264/317
[51] Int. Cl.².......................................... B29C 1/14
[58] Field of Search ........... 264/225, 220, 313, 317, 264/221

[56] References Cited

UNITED STATES PATENTS

| | | | |
|---|---|---|---|
| 3,496,633 | 2/1970 | Michie............................. | 264/219 X |
| 3,630,799 | 12/1971 | Crimmins........................ | 264/313 X |
| 3,687,413 | 8/1972 | Murfitt............................ | 264/225 X |

FOREIGN PATENTS OR APPLICATIONS

| | | | |
|---|---|---|---|
| 659,788 | 10/1951 | United Kingdom................. | 264/317 |

*Primary Examiner*—Richard R. Kucia
*Attorney, Agent, or Firm*—Wenderoth, Lind & Ponack

[57] ABSTRACT

A method of producing synthetic resin spinnerettes. Vertically extending synthetic filaments are mounted on a frame structure and placed in a mold. A thermoplastic or themosetting resin is poured into the mold and allowed to set. The molded body is removed from the mold and the filaments are removed therefrom to leave orifices.

6 Claims, 3 Drawing Figures

PRODUCTION OF SYNTHETIC RESIN SPINNERETTE

This is a continuation of application Ser. No. 822,393 filed May 7, 1969 now abandoned.

The present invention relates to a method of producing a resin-made spinnerette which is simple in structure and has excellent spinnability. More particularly, the invention relates to a method of producing a synthetic resin-made spinnerette for spinning filaments with remarkably improved spinnability, bulkiness and luster based on the desirable thermal characteristics of the spinnerette and the desired predetermined cross-sectional shape of the orifices of the spinnerette.

In spinning and particularly wet-spinning synthetic fibers, the structure and thermal characteristics of the spinnerette have an important effect on the spinnability, bulkiness, cross-sectional shape, dyeability of the spun fiber or filament.

The material of a spinnerette heretofore generally used is metal and therefore its thermal conductivity is very high. Thus, when a coagulating bath of a low temperature (e.g. about 0°C.) is used in wet-spinning, the spinning solution heated to decrease the viscosity and fed to the spinnerette is considerably cooled in the interior of the spinnerette and at the orifices before being extruded through the orifices into the coagulating liquid. Therefore, in order to create the necessary temperature difference between the spinning liquid (as extruded from the orifices) and coagulating liquid or when the spinning liquid contacts the coagulation liquid, it is necessary to greatly increase the temperature of the spinning liquid before entering the spinnerette. However, synthetic fiber (e.g. acrylic fiber) spun from such high temperature spinning liquid has various disadvantages including inferiority in general yarn quality and irregularity in dyeing. This is believed to be due to the very high temperature of the spinning liquid causing deterioration of the copolymer giving rise to coloring, and to the fact that the temperature of the coagulating liquid adjacent the orifices is locally increased because of the high temperature of the spinning liquid, and also to the fact that the spinning liquid as extruded through the orifices is not uniformly cooled by the coagulating liquid. This tendency is remarkable particularly in extruding an acrylonitrile polymer solution into a cold aqueous coagulating solution of a thiocyanate. In spinning other fibers, too, attention to the spinnerette material should naturally be paid, and it is not too much to say that in order to prevent the spinning liquid from being unduly cooled in the interior of the spinnerette and the orifices, it is important to make a spinnerette with a material having low thermal conductivity.

As a method of producing spinnerettes by using such low thermal conductivity material, mention may be made of Japanese Patent Publication No. 1562/1938 wherein there is disclosed a method of producing a glass spinnerette by arranging a plurality of wires of a metal whose melting point is higher than that of glass, such as molybdenum, pouring molten glass around the wires to produce a glass body in which the metal wires are embedded, cutting the body into pieces of suitable shape, and immersing them in a diluted sulfuric acid liquid while applying an electric current thereto thereby melting away the metal wires. According to this method, however, it is necessary that the thin metal wire to form an orifice should have as high a coefficient of thermal expansion as the glass and a higher melting point than the glass. Moreover, in addition to the difficulty of arranging a large number of thin metal wires in a narrow region, a high temperature, usually 1300°C. or above, is necessary for pouring glass around the thin metal wires, with the resultant difficulties not to be compared with that of pour-molding at a low temperature. Further, thin metal wire materials which can be used in this method are limited. Besides these drawbacks, the thermal conductivity of glass material, though low as compared with metal materials, is at least about $2 \times 10^{-3}$ cal.cm$^{-1}$.sec$^{-1}$.°C.$^{-1}$, and is considerably high when compared with a value of $1 \times 10^{-3}$ cal.cm$^{-1}$.sec$^{-1}$.°C.$^{-1}$ or less which is the thermal conductivity of a spinnerette recommended in the present invention. Further, it should also be pointed out as a drawback in acutual work that a chemical-resistant glass is high in melting point as compared with ordinary glass and hence requires an extremely high temperature for the melting operation itself.

Therefore, an object of this invention is to produce a synthetic resin spinnerette through which it is possible to produce a fiber or filament having excellent physical and chemical characteristics.

Another object of this invention is to produce a synthetic resin-made spinnerette which is excellent in thermal characteristics and spinnability.

Still further object of this invention is to produce a resinous spinnerette provided with heteromorphic orifices.

The invention will now be described in more detail with reference to the drawings wherein.

Figure 1:
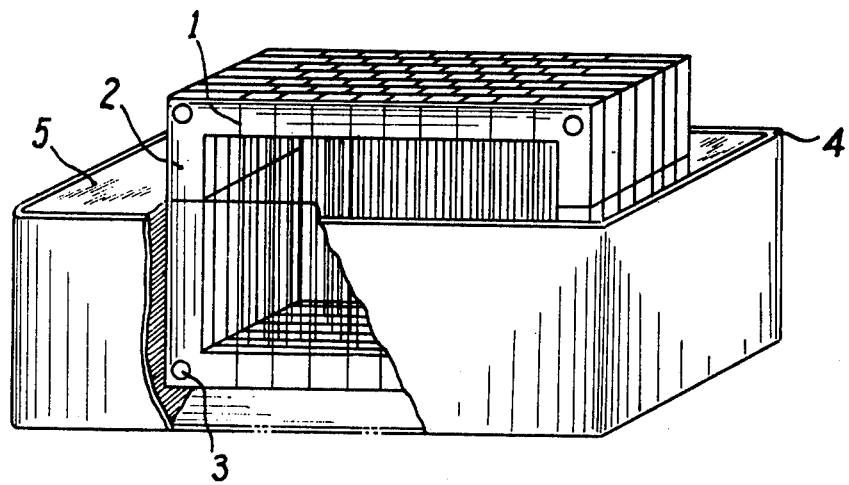
FIG. 1 is a perspective view of a mold with a frame assembly in one stage of the process of producing a spinnerette in accordance with this invention.

In FIG. 1, a plurality of frame bodies 2 are clamped together by suitable means such as bolts 3 or the like. A plurality of synthetic filaments 1 corresponding to the positions of orifices of the final spinnerette are passed taut around the frames at predetermined intervals.

As the synthetic filaments, there may be used those having a suitable fineness and cross-sectional shape corresponding to the diameter of the orifices to be formed in the spinnerette, for example, polyamide type synthetic fiber, polyester type synthetic fiber, polyolefin type synthetic fiber and acrylic type synthetic fiber filaments.

The frame assembly with the vertically extending synthetic filaments is placed in a mold 4 as shown. Then in the mold 4 is poured a thermoplastic or thermosetting synthetic resin which is, of course, different from the resin forming the synthetic filaments. As for thermoplastic or thermosetting synthetic resins, it is recommended to use those pourmoundable resins which have higher thermal deformation temperature (defined in ASTM 648) than the spinning liquid temperature and which will not swell or dissolve in solvents to be used in the subsequent process of dissolving away the synthetic filaments 1, or will not be thermally deformed in the subsequent process of melting away the synthetic fiber filaments and whose thermal conductivity is $1 \times 10^{-3}$ cal.cm$^{-1}$ sec$^{-1}$.°C.$^{-1}$ or less after the pour-molding and setting. More specific examples are epoxy resin, unsaturated polyester resin, methacrylic resin, phenol resin, alkyd resin, etc., but other synthetic resins may of course be used depending upon the particular synthetic fiber filaments 1.

In order to produce a synthetic resin spinnerette by such arrangement, the following procedures are taken. First, the synthetic fiber filaments 1 are passed taut around and fixed to the frames 2 correspondingly to the spacing of desired orifices. Then the required number of frames 2 are clamped together by the clamping means 3. If desired a single frame having holes on the upper and lower crosspieces thereof for inserting the synthetic fiber filaments thereinto to pass them taut may be used, instead of a plurality of frames 2.

Then, the frame assembly is disposed in the mold box 4 and a thermoplastic or thermosetting resin 5 containing a setting agent is pour-molded in the mold 4 and allowed to set with the synthetic filaments 1 embedded in the pour-molded synthetic resin layer. Upon completion of setting, the pour-molded synthetic resin article, with the frame assembly 2 and synthetic fiber filaments 1 embedded therein, is taken out of the mold 4 and the frames 2 are pared or cut away and the mass wherein the synthetic filaments are surrounded by and embedded in the resin layer is recovered. That is to say, the synthetic filaments 1 alone which are to form orifices for the spinnerette are arranged, surrounded and embedded at predetermined intervals in the pour-molded synthetic resin article which has set. Then, a mechanical finishing treatment such as polishing is applied to the pour-molded synthetic resin article to give required size and smoothness to the surfaces thereof. The end surfaces of the synthetic filaments are exposed in the upper and lower surfaces of the resin article. The pour-molded synthetic resin article is then immersed in a solvent for dissolving away the synthetic filaments 1, while being subjected to heating, supersonic vibrations or other action, if necessary. In this way, the synthetic filaments 1 in the pour-molded synthetic resin article are disolved out, leaving orifices corresponding to the fineness and cross-sectional shape of said synthetic filaments. Alternatively, it is possible to heat the synthetic fiber filaments themselves to melt them away for removal.

Figure 2:
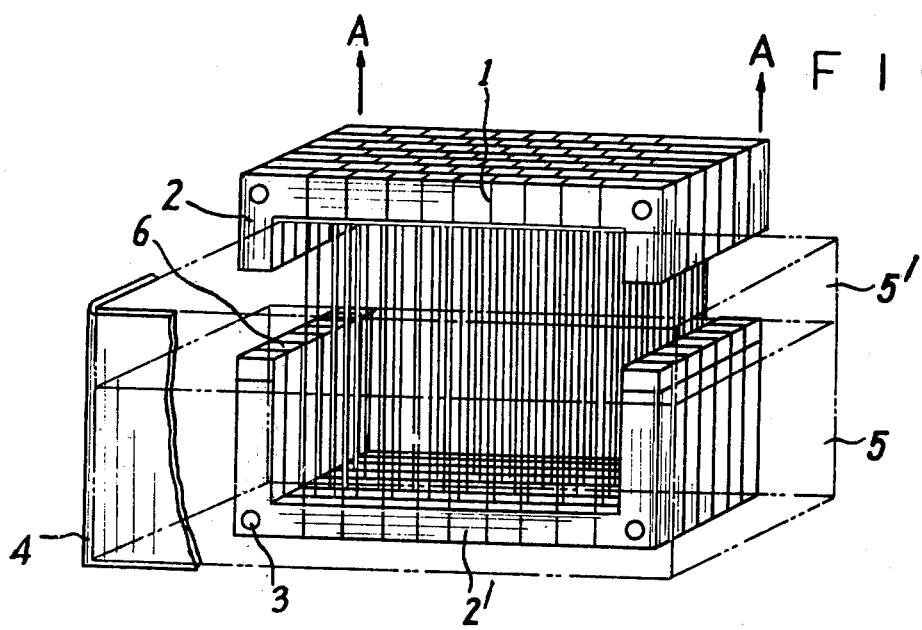
FIG. 2 is a view similar to FIG. 1 but showing a different mode of embodiment of the present invention.
Figure 3:
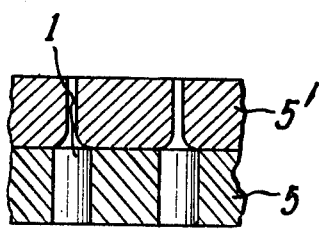
FIG. 3 is an enlarged view of the pour-molded resin layers shown in FIG. 2.

A different mode of embodying the present method is shown in FIGS. 2 and 3. It has been conventional to make the thickness of the spinnerette as thin as possible by decreasing the back pressure of a spinning liquid at the back surface of the spinnerette. This is advantageous, coupled with a decrease in the resistance to the flow of the spinning liquid in the orifices, for continuing a smooth spinning (extruding) operation and maintaining the homogeneity of the resulting filament tow. For this reason, generally, the diameter of the orifice is larger on the spinning liquid supply side and smaller on the discharge or extrusion side, that is, at the orifice outlet. Conventionally, in order to form such orifice having unequal diameter portions, a smaller diameter portion is first bored as by punching or drilling, and then a larger diameter portion is bored as by a larger punch or drill. With such mechanical method, however, not only is it difficult to finish the inner surface of orifices to provide a flat surface having no burr, but also the boring process itself is extremely complicated, so that the resulting spinnerette is inevitably very expensive.

By slightly modifying the aforesaid method of producing spinnerettes according to the present invention, orifices having such unequal diameter channels can be formed easily. As shown in FIGS. 2 and 3, there are employed bisected frame members 2, 2'. These sections are initially contacted together at their junction surface 6 and in this condition the synthetic filaments 1 are passed taut therearound and fixed in position in a manner similar to that shown in FIG. 1. Then, the frame assembly is placed in the mold 4 and a first layer 5 of a thermoplastic or thermoplastic synthetic resin is pour-molded in mold 4 and allowed to set. In this case the height to which the first synthetic resin layer 5 is pour-molded in the mold 4 should not exceed the junction surface 6 of the frame sections 2 and 2'. That is to say, of the frame sections 2 and 2', the upper frame section 2 and upper part of the synthetic filaments 1 are exposed above the surface of the pour-molded first synthetic resin layer 5. After the pour-molding and setting of the first synthetic resin layer 5, the portions of the synthetic filaments 1 exposed above the aforesaid synthetic resin surface is subjected to stretching. In this case said synthetic filaments may be heated to a suitable temperature in order to facilitate the stretching. Thus the upper frame assembly 2 is pulled upwardly as shown in an arrow A to stretch or drawn the filaments 1 above the first resin layer 5 and is fixed again in a suitable position while maintaining the synthetic filaments 1 in a stretched condition as shown in FIG. 2 or 3. That is to say, the synthetic filaments 1 exposed above the surface of the first synthetic resin layer 5 will become smaller in diameter so that there is formed a funnel-like portion adjacent the upper end of the filament as embedded in the first synthetic layer 5 as clearly shown in FIG. 3.

In order to effect the heating of the synthetic filaments 1 to facilitate stretching, any suitable method may be employed. Thus, for example, hot air may be directed at the synthetic filaments 1 exposed above the pour-molded surface of the first synthetic resin layer 5, but any other means may be employed so far as it can transmit a sufficient amount of heat to facilitate uniform stretching of the synthetic filaments exposed above the pour-molded resin surface.

Then, a second layer 5' of a thermosetting or thermoplastic synthetic resin similar to the synthetic resin forming the first layer is pour-molded in the mold 4, so that the portions of the aforesaid synthetic filaments 1 decreased in diameter are surrounded with and embedded in said second synthetic resin layer 5'.

The thus pour-molded first and second synthetic resin layers 5 and 5' are completely integrally joined together, surrounding the synthetic fiber filaments 1 whose diameter is continuously changed in the direction of filament axis to form orifices of unequal diameter. Thereafter, the molded article is treated in the same manner as explained before with reference to FIG. 1, to obtain a spinnerette having the required arrangement and shape of orifices.

Examples of the present method will now be described hereinafter but the present invention is not limited to these examples.

EXAMPLE 1

A spinnerette was produced by the method shown in FIG. 1. First, nylon monofilaments of Y-shaped cross-section (180 denier, each) produced by melt-spinning nylon-6 resin were passed taut around frames (each 1 mm. in thickness) of phenol resin in such a manner that 22 monofilaments were arranged per frame at intervals of 1 mm. The pitches at which the aforesaid monofilaments were arranged were shifted from those of adjacent frame in zigzags alternately by one-half pitch, namely 0.5 mm. The frames being 23 in total number were assembled together and clamped by means of through bolts. The frame assembly was placed in a mold, and an epoxy resin fluid consisting of 21.2 parts by weight of setting or curing agent HT 972 (CIBA Ltd.) and 100 parts by weight of epoxy resin Araldite F (CIBA Ltd., thermosetting resin) was pour-molded and allowed to stand at 50°C. for 5 hours for setting. The molded article was taken out of the mold and was cut perpendicularly to the direction of axis of the surrounded, embedded and fixed monofilaments, and the frame bodies were also cut off, thereby obtaining a spinnerette blank of right square cross-section, 3 mm. in thickness and 35 mm. long in each side, having 506 orifices of Y-shaped cross-section. The said spinnerette blank was then subjected to polishing finish to give the cut surface a required size and smoothness, and then immersed in a saturated methanol solution of calcium chloride at 60°C. for 24 hours to dissolve out the nylon monofilaments, thereby producing an epoxy resin spinnerette with 506 Y-shaped orifices, whose thermal deformation temperature was 230°C. and cross-sectional area was 0.023 mm$^2$.

EXAMPLE 2

The spinnerette blank of polished plate in the aforesaid Example 1 was immersed in a saturated methanol solution of calcium chloride and supersonic waves of 25 kc were applied thereto for 6 hours. The nylon monofilaments in the spinnerette blank were completely dissolved out and a spinnerette having orifices similar to those in Example 1 was obtained.

EXAMPLE 3

A spinnerette was produced by the method shown in FIG. 2. In this Example, the material, fineness and number of the synthetic monofilaments, the material of the synthetic resin to be pour-molded and the synthetic filament-dissolving liquid were same as those in Examples 1 and 2. First, an epoxy resin was pour-molded so as to provide a thickness of 2 mm. for the first synthetic resin layer, and was allowed to stand at a temperature of 50°C. for 5 hours. The nylon mono-filaments exposed above the surface of the pour-molded first resin layer were heated to 180°C. by hot air. The nylon monofilaments were stretched until the minimum cross-sectional area becomes about one-third of the original or cross-sectional area of the monofilament embedded in the first synthetic resin layer. A second layer (3 mm. in thickness) of epoxy resin was then pour-molded onto the aforesaid pour-molded first synthetic resin layer and was allowed to stand at 50°C. for 5 hours for setting or curing. Thereby the first and second layers were completely joined together. In this way there was obtained a spinnerette blank having a cross-section as shown in FIG. 3. Then the molded article was processed in the same manner as in Example 1 and the nylon monofilaments were dissolved as in Example 2, to obtain an epoxy resin spinnerette with 506 orifices presenting a funnel-shaped longitudinal secton.

EXAMPLE 4

Polyester resin POLYLITE (Japan Liechhold Co., thermosetting rein) was used as material for preparing a spinnerette blank, and 506 low pressure-processed polyethylene monofilaments (180 deniers, each) whose melting point is 125°C. were used as synthetic filaments for forming orifices. A spinnerette blank was produced by the method shown in FIG. 1. However, a mixture consisting of 1 part by weight of methyl ethyl ketone and 2 parts by weight of cobalt naphthenate were added to 100 parts by weight of the polyester resin. After pouring; the whole was heated at 70°C. for 24 hours. The method for arrangement of monofilaments and the size of the spinnerette blank were similar to those of Example 1. After the spinnerette blank taken out of the mold was subjected to polishing finish, it was allowed to stand in a heated atmosphere at 130°C. for 24 hours while applying vibrations thereto to melt away the polyethylene filaments, whereby a spinnerette of polyester resin having a thermal deformation temperature of 146°C. was obtained.

According to the present invention, it is possible to obtain a spinnerette having superior thermal characteristics and spinnability by simple process without the difficulties involved in the production of glass spinnerettes. Further, orifices with a cross-section of irregular shape can be formed with extreme ease in contrast to a conventional spinnerette made of metal or glass which involves much difficulty in forming orifices having a cross-section of irregular shape.

Improvements in spinnability, bulkiness and luster of spun fibers based on the unique structure and thermal characteristics of spinnerettes according to the present invention are to be noted as merits.

What is claimed is:

1. A method of producing synthetic resin spinnerettes having orifices each with a smaller diameter portion and a larger diameter portion characterized by vertically extending synthetic filaments passed taut around and fixed to a frame structure vertically separable into upper and lower sections, placing the frame structure in a mold, pour-molding a first layer of thermosetting synthetic resin having a thermal conductivity of $1 \times 10^{-3}$ cal.cm$^{-1}$.sec$^{-1}$.°C$^{-1}$ or less after setting in said mold to a thickness not reaching the junction of said frame sections and allowing it to set, pulling up the upper frame section to stretch the synthetic filaments exposed above the first resin layer, pour-molding a second layer of the aforesaid synthetic resin in the mold and above the first layer and allowing it to set, taking the cured article out of the mold to obtain a resin body surrounding and embedding the synthetic filaments therein, and then removing the filaments to form said orifices.

2. A method as claimed in claim 1 wherein the frame structure is removed before the filaments are removed.

3. A method as claimed in claim 1 wherein the filaments are removed by being dissolved away with a solvent.

4. A method as claimed in claim 1 wherein the filaments are removed by being melted away under heating.

5. A method as claimed in claim 1 wherein said resin is selected from the group consisting of epoxy resins, unsaturated polyester resin, methacrylic resin, phenol resins and alkyd resins.

6. A method as claimed in claim 1 wherein said synthetic filament is selected from the group consisting of polyamide, polyester, polyolefin or acrylic synthetic filament.

* * * * *